(12) United States Patent
Sorrentino

(10) Patent No.: US 9,337,978 B2
(45) Date of Patent: May 10, 2016

(54) SEQUENCE DERIVATION FOR REFERENCE SIGNAL PATTERNS

(75) Inventor: Stefano Sorrentino, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 710 days.

(21) Appl. No.: 13/390,227

(22) PCT Filed: Jan. 4, 2012

(86) PCT No.: PCT/SE2012/050005
§ 371 (c)(1),
(2), (4) Date: Feb. 13, 2012

(87) PCT Pub. No.: WO2013/012369
PCT Pub. Date: Jan. 24, 2013

(65) Prior Publication Data
US 2013/0170441 A1  Jul. 4, 2013

Related U.S. Application Data

(60) Provisional application No. 61/511,323, filed on Jul. 25, 2011, provisional application No. 61/510,284, filed on Jul. 21, 2011.

(51) Int. Cl.
| | |
|---|---|
| *H04W 4/00* | (2009.01) |
| *H04L 5/00* | (2006.01) |
| *H04W 72/04* | (2009.01) |
| *H04L 12/26* | (2006.01) |
| *H04W 72/08* | (2009.01) |

(52) U.S. Cl.
CPC ............ *H04L 5/0048* (2013.01); *H04L 5/0062* (2013.01); *H04L 43/08* (2013.01); *H04W 72/04* (2013.01); *H04W 72/042* (2013.01); *H04W 72/048* (2013.01); *H04W 72/0413* (2013.01); *H04W 72/0433* (2013.01); *H04W 72/0453* (2013.01); *H04W 72/082* (2013.01)

(58) Field of Classification Search
CPC ..... H04L 43/08; H04L 5/0062; H04L 5/0048; H04W 72/04; H04W 72/0413; H04W 72/042; H04W 72/0433; H04W 72/0453; H04W 72/048; H04W 72/082
USPC .......................... 370/329, 330, 252, 436, 478
See application file for complete search history.

(56) References Cited

U.S. PATENT DOCUMENTS

| | | | |
|---|---|---|---|
| 2009/0046645 A1* | 2/2009 | Bertrand et al. | 370/329 |
| 2010/0002804 A1* | 1/2010 | Ogawa et al. | 375/300 |
| 2010/0034312 A1 | 2/2010 | Muharemovic et al. | |
| 2010/0182898 A1* | 7/2010 | Li et al. | 370/208 |
| 2010/0272022 A1* | 10/2010 | Iwai et al. | 370/328 |

(Continued)

FOREIGN PATENT DOCUMENTS

WO   2008094014 A2   8/2008

*Primary Examiner* — Peter Cheng
(74) *Attorney, Agent, or Firm* — Coats & Bennett, PLLC

(57) ABSTRACT

A reference signal, RS, is generated in a wireless communication system based on a starting position, in the frequency domain, of the RS and a transmission channel bandwidth of the RS. At least one of the starting position of the RS and the bandwidth allocated to a transmission channel for the RS is/are ascertained. A base sequence index, BSI, is then derived by mapping at least one ascertained of the RS starting position and transmission channel bandwidth (12) according to a predefined mapping rule (14) to the BSI (16). The RS is determined based on the derived BSI.

31 Claims, 12 Drawing Sheets

(56) References Cited

U.S. PATENT DOCUMENTS

| | | | |
|---|---|---|---|
| 2011/0085515 A1* | 4/2011 | Qu et al. | 370/330 |
| 2011/0235682 A1* | 9/2011 | He et al. | 375/132 |
| 2012/0002735 A1* | 1/2012 | McCoy | 375/259 |
| 2013/0121290 A1* | 5/2013 | Kim et al. | 370/329 |

* cited by examiner

Overlapping BW: the UEs are configured to employ the same BSI

Different BW: the UEs are configured to employ different BSIs

Different positions in frequency domain: UEs configured to employ different BSIs

SEQUENCE DERIVATION FOR REFERENCE SIGNAL PATTERNS

TECHNICAL FIELD

The present invention relates generally to wireless communication systems, and in particular to a method of generating a reference signal, a controller for generating a reference signal, a corresponding computer program product, a transmitter, a receiver, and a wireless communication system.

BACKGROUND

Modern wireless communications networks are commonly arranged in a "cellular" configuration, wherein a base station (also known as eNode B, or eNB) provides wireless communication services to subscribers, for example using mobile terminals (also known as User Equipment, or UE) within a geographic area, called a cell or sector. Most modern systems utilize coherent processing, wherein a receiver is assumed to be able to estimate the radio channel from a transmitter, and to take advantage of the channel quality information to more accurately detect transmitted data from received signals. To enable the receiver to estimate the channel, a transmitter that transmits a series of known (to the receiver) data patterns, known as reference signals (RS) or demodulation reference signals (DMRS) (referred to herein as simply RS). Using a priori knowledge of the RS data pattern, the receiver can estimate distortion effects injected by the wireless communication channel, then use these channel estimates to better extract data from wireless communication signals received from the same transmitter.

Particularly in the uplink (UL) direction (i.e., from UE to eNB), due to the large number of UE in a cell, the RS transmitted by different UE towards the same eNB are subject to interference from each other. Additionally, UL transmissions in a cell are subject to interference from transmissions in neighboring cells. Many modern wireless communication networks support a hierarchical arrangement of smaller cells (e.g., micro-cells or pico-cells) within the geographic area of a cell (known as heterogeneous networks, or HetNet). In these environments, UL RS transmissions from different UE are subject to even greater interference.

To mitigate or eliminate UL RS interference, the data patterns comprising the RS may be made orthogonal to each other. For example, a base sequence common to a plurality of UE—such as by being derived from a cell-ID—may be subjected by each UE to a different cyclic time shift (CS) value. As another example, orthogonal cover codes (OCC) multiplex RS based on orthogonal time domain codes. Although these techniques are effective in multiplexing RS assigned to UE transmitting on fully overlapping bandwidths, orthogonality is lost when the bandwidths differ and/or when an interfering UE employs another base sequence. With OCC, the problem is that it is limited to low mobility and only two UEs.

Modern wireless communication technology developments give rise to further problems regarding the reception and use of RS from UE. Multiple Input Multiple Output (MIMO) techniques utilize multiple antennas on transmitters and/or receivers to improve reception accuracy and/or increase data rates through spatial multiplexing of multiple data streams. Coordinated Multipoint Processing (CoMP) is a technique wherein the scheduling and/or signal processing of transmissions in multiple cells are coordinated to improve link quality. These technological developments require scheduling flexibility and improved channel estimation quality, even for geographically far away UE belonging to another cell. Making cell coverage more dense (e.g., HetNet), increasing the number of receive antennas, and CoMP processing emphasize the need for orthogonal RS between different cells, without affecting scheduling flexibility and multiplexing capacity of the RS.

SUMMARY

It is an object of the invention to provide improved reference signal generation.

In a first aspect, there is provided a method of generating a reference signal, RS, in a wireless communication system. At least one of a starting position, in the frequency domain, of the RS and a bandwidth allocated to a transmission channel for the RS is/are ascertained. A base sequence index, BSI, is then derived by mapping at least one ascertained of the starting position and transmission channel bandwidth according to a predefined mapping rule to the BSI. The RS is determined based on the derived BSI.

The method can for example be performed by a transmitter of the wireless communication system, wherein the RS is to be transmitted from the transmitter to a receiver in the wireless communication system.

In this way, it is possible to assign different BSI to different transmitters, such as UEs, as long as the scheduling assignment of the RS, i.e. starting position and/or allocated bandwidth of the RS, differs between the transmitters.

On the other hand, it becomes possible assign the same BSI to transmitters, such as UEs, belonging to different cells, but co-scheduled on fully overlapping bandwidth. At the same time, co-scheduled transmitters which are not assigned to fully overlapping bandwidth are typically assigned different BSI.

The method can also be performed by a receiver of the wireless communication system, wherein the RS determined by the receiver corresponds to a RS initially transmitted from a transmitter to the receiver. This allows the receiver to combine the determined RS to a received RS in order to estimate the channel between the transmitter and receiver.

In a second aspect, there is provided a controller for generating a reference signal, RS, in a wireless communication system, wherein the controller is configured to perform the method according to the first aspect.

In a third aspect, there is provided a computer program product comprising a non-transitory computer readable medium having stored therein a set of instructions for performing, when executed by a computer-based system, the method according to the first aspect.

In a fourth aspect, there is provided a transmitter comprising an antenna, and a transmitter, TX, operatively coupled to the antenna and configured to transmit a reference signal, RS, to a receiver. The transmitter further comprises a controller configured to control the transmitter, and configured to ascertain at least one of a starting position, in the frequency domain, of the RS to transmit, and a bandwidth allocated to the transmitter for transmission of the RS, derive a base sequence index, BSI, by mapping at least one ascertained of the starting position and transmission bandwidth according to a predefined mapping rule to the BSI, and determine a sequence to transmit as the RS based on the derived BSI.

In a fifth aspect, there is provided a receiver comprising an antenna, a receiver, RX, operatively coupled to the antenna and configured to receive a reference signal, RS, transmitted from a transmitter, wherein the received RS differs from the RS initially transmitted from the transmitter due to distortion effects injected by the wireless communication channel. The receiver further comprises a controller configured to ascertain at least one of a starting position, in the frequency domain, of the RS, and a bandwidth allocated to a transmission channel for the RS, derive a base sequence index, BSI, by mapping at least one ascertained of the starting position and transmission channel bandwidth according to a predefined mapping rule to the BSI, and determine the RS initially transmitted from the transmitter based on the derived BSI. The receiver also comprises a channel estimator configured to execute a channel estimation algorithm and estimate the wireless communication channel based on the received RS and the determined RS.

In a sixth aspect, there is provided a wireless communication system comprising a first base transceiver, a first mobile transceiver, a second base transceiver, and a second mobile transceiver. The first base transceiver is operative to provide wireless communications in a first cell. The first mobile transceiver is associated with the first cell and operative to transmit a reference signal, RS, to the first base transceiver, the RS comprising a data sequence based on a base sequence index, BSI, generated by the first mobile transceiver. The second base transceiver is operative to provide wireless communications in a second different cell. The second mobile transceiver is associated with the second cell and operative to transmit a reference signal, RS, to the second base transceiver, the RS comprising a data sequence based on a BSI generated by the second mobile transceiver. When the first and second mobile transceivers are scheduled in the respective first and second cells such that they have the same starting position, in frequency, for transmitting RS, and/or they have the same allocated transmission bandwidth for transmission of RS, the first and second mobile transceivers are configured to generate the same BSI based on information representative of at least one of the starting position and transmission bandwidth.

In yet another aspect, there is provided a controller for generating a reference signal, RS. The controller comprises an ascertainer configured to ascertain at least one of a starting position, in the frequency domain, of the RS, and a bandwidth allocated to a transmission channel for the RS. The controller further comprises a base sequence index, BSI, deriver configured to derive a base sequence index, BSI, by mapping at least one of the starting position and transmission channel bandwidth according to a predefined mapping rule to the BSI. The controller also comprises a RS determiner configured to determine the RS based on the derived BSI.

The present invention will now be described more fully hereinafter with reference to the accompanying drawings, in which embodiments of the invention and related information are shown. However, this invention should not be construed as limited to the embodiments set forth herein. Rather, these embodiments are provided so that this disclosure will be thorough and complete, and will fully convey the scope of the invention to those skilled in the art.

DETAILED DESCRIPTION

Figure 1:
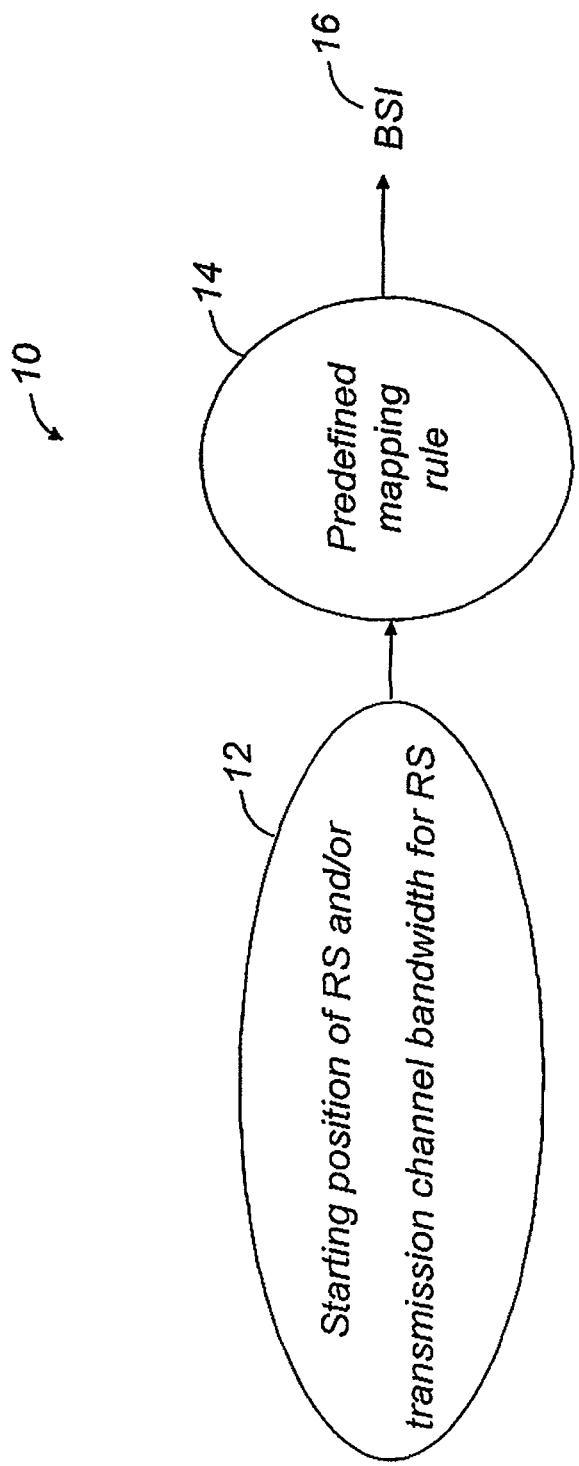
FIG. 1 is a diagram illustrating a basic example of how to generate a Base Sequence Index, BSI.

According to one or more illustrative, non-limiting embodiments described and claimed herein, RS sequences are for example generated by deriving a base sequence index (BSI) for each transmitter based on the starting point of RS for the transmission channel and/or the bandwidth (BW) allocated to the transmission channel. The BSI is obtained, for example by applying a predefined mapping rule to the RS starting point and BW. FIG. 1 is a diagram illustrating a basic example of how to generate a Base Sequence Index, BSI. The overall process 10 starts with a starting position and/or transmission channel bandwidth 12 of the RS and applies a predefined mapping rule 14 to map the starting position and/or transmission channel bandwidth 12 into a BSI 16. The mapping rule 14 is typically the same at the transmitter (e.g., UE) and receiver (e.g., eNB); hence, the receiver knows the RS sequence a priori. As understood, the method may thus be performed by a transmitter and/or a receiver of the wireless communication system. When the method is implemented by a transmitter, the determined RS is to be transmitted from the transmitter to a receiver in the wireless communication system. When the method is implemented by a receiver, the determined RS can subsequently be combined with the RS as received from the corresponding transmitter in order to estimate the channel between the transmitter and receiver. Transmitters having overlapping BW and the same RS starting points will generate the same BSI; transmitters having different BW and/or RS starting points will generate different BSI. The BSI is used to generate RS data sequences, such as by applying an allocated (sequence group), CS, OCC, and the like to the base sequence indexed by the generated BSI. In some embodiments, additional inputs to the predefined mapping rule may include a default group and/or sequence index; a cyclic shift indicator; a cell-ID; or a configurable, cell-specific sequence index offset. In this manner, orthogonality may be maintained among a large number of potentially interfering transmitters, without affecting scheduling flexibility or the multiplexing capacity of the RS.

More generally, the base sequence index is derived based on at least one of the RS starting point and transmission channel bandwidth, as will be exemplified in the present disclosure.

Figure 2:
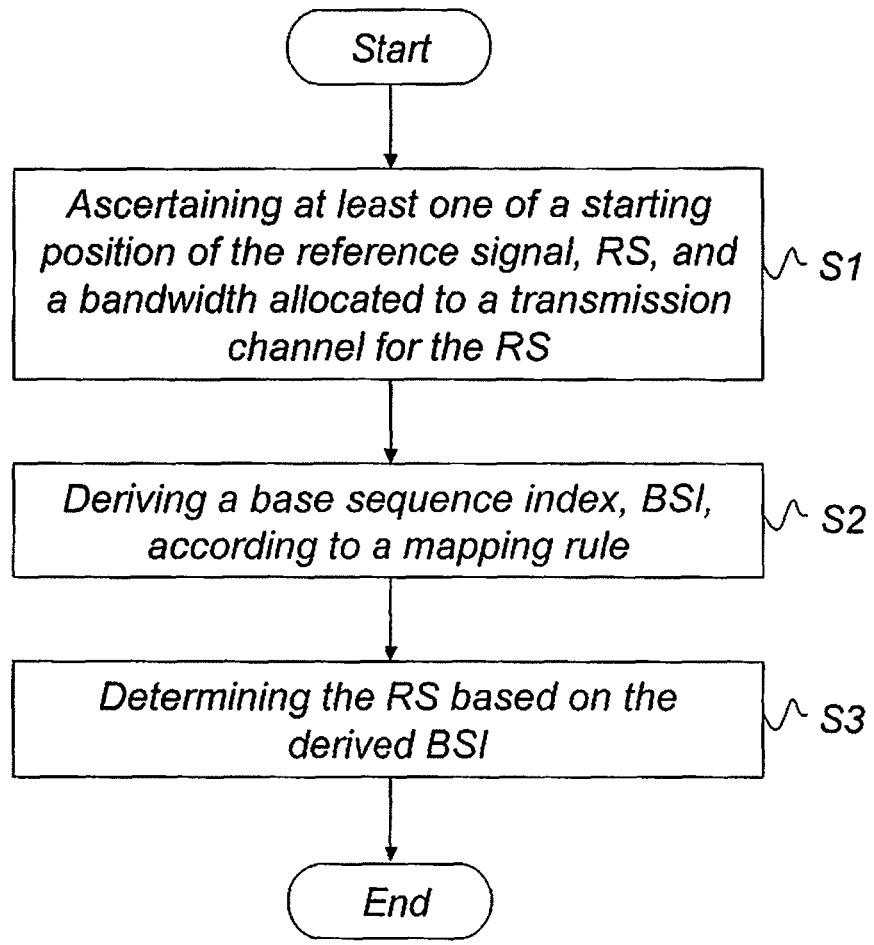
FIG. 2 is a schematic flow diagram illustrating an example of a method for generating a reference signal.

FIG. 2 is a schematic flow diagram illustrating an example of a method for generating a reference signal. In step S1, at least one of a starting position, in the frequency domain, of the reference signal, RS, and a bandwidth allocated to a transmission channel for the RS is/are ascertained. In step S2, a base sequence index, BSI, is derived by mapping at least one ascertained of the starting position and transmission channel bandwidth, i.e. starting position and/or bandwidth, according to a predefined mapping rule into the BSI. In step S3, the RS is determined based on the derived BSI.

The steps S1-S3 may be performed by a transmitter of the wireless communication system, wherein the determined RS is to be transmitted from the transmitter to a receiver in the wireless communication system.

By way of example, the step S1 of ascertaining includes ascertaining the starting position, in the frequency domain, of the RS, and ascertaining the bandwidth allocated to a transmission channel for the RS, and the step S2 of deriving a base sequence index includes mapping at least the starting position and transmission channel bandwidth according to a predefined mapping rule to the BSI, as will be exemplified later on.

By way of example, the RS starting position and transmission channel bandwidth may be received in a scheduling assignment message.

Alternatively, the base sequence index, BSI, is derived by mapping the starting position according to the mapping rule into the BSI. Information on the allocated transmission channel bandwidth may then be used for determining the length of the base sequence indexed by the derived BSI.

The RS may be determined based on the derived BSI in a wide variety of ways, including any conventional method for determining a RS sequence once the BSI is derived. For example, the step S3 of determining the RS based on the derived BSI may include applying a cyclic shift, CS, value to a base sequence indexed by the BSI. Optionally, this may further include applying an orthogonal cover code, OCC, to the base sequence shifted by the CS.

Figure 3:
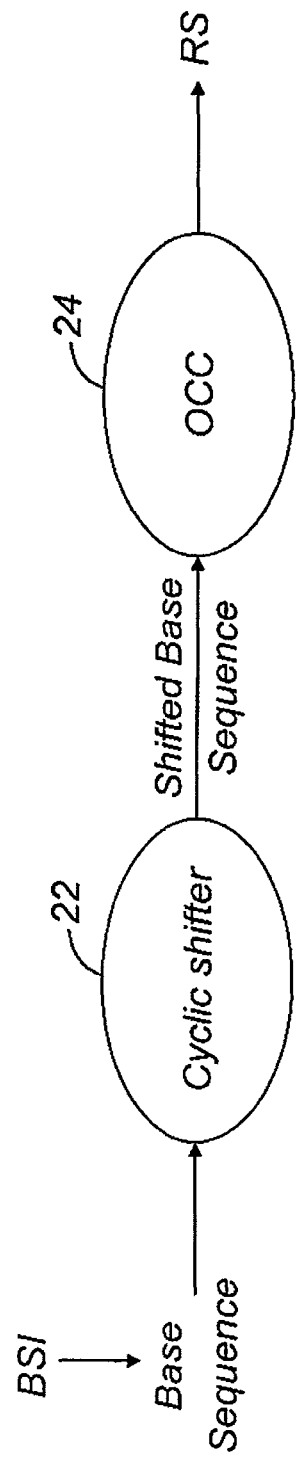
FIG. 3 is a schematic diagram illustrating an example of how to generate a Reference Signal, RS, based on a base sequence indexed by a Base Sequence Index, BSI.

FIG. 3 is a schematic diagram illustrating an example of how to generate a Reference Signal, RS, based on a base sequence indexed by a Base Sequence Index, BSI. The base sequence indicated by the BSI is input to a conventional cyclic shifter 22 and the resulting shifted base sequence may optionally be input to an OCC operator 24 to produce the RS.

With reference once again to FIG. 2, the step S2 of deriving a base sequence index, BSI, may under certain circumstances include deriving a BSI substantially unique to the transmitter among transmitters in the same cell. Typically, the BSI is substantially unique to the transmitter among transmitters in the same cell, as the other transmitters within the cell are not co-scheduled on the same bandwidth.

On the other hand, the step S2 of deriving a base sequence index, BSI, by mapping at least one ascertained of the starting position and transmission channel bandwidth according to a predefined mapping rule enables assignment of the same BSI to User Equipments, UEs, belonging to different cells, but co-scheduled on fully overlapping bandwidth. At the same time, the step S2 of deriving a base sequence index according to the mapping rule enables assignment of different BSI to co-scheduled UEs which are not assigned to fully overlapping bandwidth.

The steps S1-53 may also be performed by a receiver of the wireless communication system, wherein the determined RS corresponds to a RS initially transmitted from a transmitter to the receiver.

In the following, further examples of various illustrative and non-limiting embodiments will be presented and explained, for example in terms of the 3GPP Long Term Evolution Advanced (LTE-Advanced) extensions to the Universal Mobile Telecommunications System (UMTS). In particular, the generation of orthogonal or nearly orthogonal (semi- or pseudo-orthogonal) reference signals (RS) will primarily be described with reference to a plurality of User Equipment (UE) in the uplink (UL)—that is, transmitting to an eNodeB (eNB). Those of skill in the art will readily recognize, however, that the present invention is not limited to LTE. In general, embodiments may be advantageously applied in other cellular wireless communication networks, such as WCDMA, WiMax, UMB, GSM, and the like, and indeed may be applied in any wireless communication system where efficiency and flexibility in the generation of RS signals is important. The skilled person also understands that the present technology may be useful for downlink, DL, scenarios. The present technology is thus generally applicable to communication devices such as one or more transmitters and/or one or more receivers communicating with each other over one or more radio channels in a wireless communication system. Transmitters and receivers may include UEs, also referred to as mobile transceivers, and base stations, also referred to as base transceivers.

It may be useful to begin with a brief review of some of the basic features of the illustrative example of an LTE network. The LTE network is designed to support UEs from different releases (i.e., Rel-8/9/10/11) in a backward-compatible way. One of the LTE network design objectives is to enable co-scheduling of such UEs in time, frequency and space (i.e., MU-MIMO) dimensions with as few scheduling constraints as possible.

Furthermore, the LTE standard should be able to support various and flexible deployments. Some examples of expected deployments for modern LTE networks (Rel-11 and beyond) include macro-deployments, where large cells are typically divided into independent sectors; HetNet-deployments, where pico-cells are deployed within the coverage of a macro-cell, such as to improve coverage for high data rate UEs; and "hotspot" scenarios where an access point serves a small area with high throughput need.

A "cell" is characterized in LTE by a "cell-ID" and the carrier frequency, which affects several cell-specific algorithms and procedures.

In addition, LTE networks are designed with the aim of enabling optional Coordinated Multipoint Processing (CoMP) techniques, where different sectors and/or cells operate in a coordinated way in terms of, e.g., scheduling and/or processing. An example is UL CoMP, where the signal originating from a single UE is typically received at multiple reception points and jointly processed in order to improve the link quality. UL joint processing (also referred to as UL CoMP) allows transformation of what is regarded as inter-cell interference in a traditional deployment, into useful signal. Therefore, LTE networks taking advantage of UL CoMP may be deployed with smaller cell size, compared to traditional deployments, in order to fully take advantage of the CoMP gains.

The UL of LTE is designed assuming coherent processing, i.e., the receiver is assumed to be able to estimate the radio channel from a transmitting UE and to take advantage of such information in the detection phase. Therefore, each transmitting UE sends a reference signal (RS) associated with each UL data channel, such as the Physical Uplink Shared Channel (PUSCH).

RS from different UEs within the same cell potentially interfere with each other and, assuming synchronized networks, even with RS originated by UEs in neighboring cells.

In order to limit the level of interference between RSs different techniques have been introduced in different LTE releases in order to allow orthogonal or semi-orthogonal RSs. The design principle of LTE assumes orthogonal RS within each cell and semi-orthogonal RS among different cells (even though orthogonal RSs can be achieved for aggregates of cells by so called "sequence planning").

In the particular example of LTE, each RS is characterized by a group-index, g, and a sequence-index, s, which together define the so-called base sequence, and by the cyclic shift of the base sequence. Base sequences are cell-specific in Rel-8/9/10, and they are a function of the cell-ID. Different base sequences are semi-orthogonal. The RS for a given UE is only transmitted on the same bandwidth of PUSCH and the base sequence is correspondingly generated so that the RS signal is a function of the PUSCH bandwidth. For each subframe, two RS are transmitted, one per slot.

Orthogonal RS can be achieved by use of cyclic shift (CS) in Rel-8/9 or by CS in conjunction with orthogonal cover codes (OCC) in Rel-10. It is presumed that CS and OCC will be supported also by Rel-11 UEs.

CS is a method to achieve orthogonality based on cyclic time shifts, under certain propagation conditions, among RS generated from the same base sequence. Only 8 different CS values can be indexed in Rel-8/9/10, even though in practice less than 8 orthogonal RS can be achieved, depending on channel propagation properties. Even though CS is effective in multiplexing RSs assigned to fully overlapping bandwidths, orthogonality is lost when the bandwidths differ and/or when the interfering UE employs another base sequence.

OCC is a multiplexing technique based on orthogonal time domain codes, operating on the two RS provided for each UL subframe. The OCC code [1 −1] is able to suppress an interfering RS as long as its contribution, after the eNB matched filter, is identical on both RSs of the same subframe. Similarly, the OCC code [1 1] is able to suppress an interfering RS as long as its contribution, after the eNB matched filter, has opposite sign respectively on the two RSs of the same subframe.

While base sequences are normally assigned in a semi-static fashion (e.g., provided to UE by the network on an infrequent basis), CS and OCC are UE-specific and dynamically assigned as part of the scheduling grant for each UL PUSCH transmission. In particular, an index may be transmitted to the UE in a downlink control information (DCI) assignment, and the index used to access a table of CS and OCC values provisioned in the UE.

Even though joint processing techniques may be applied for PUSCH, channel estimates based on RS are typically performed independently at each reception point, even in the case of UL CoMP. Therefore, it is important to keep the interference level at an acceptably low level, especially for RSs.

One of the main innovations in the UL for LTE Rel-10 is the introduction of multi-antenna techniques, which can significantly increase the data rates and reliability of a wireless communication system. The performance is particularly improved if both the transmitter and the receiver are equipped with multiple antennas. This results in a multiple-input multiple-output (MIMO) communication channel, and such systems and/or related techniques are commonly referred to as MIMO.

LTE Rel-10 supports a single-user, spatial multiplexing mode (SU-MIMO) in the communication from a single UE to the eNB. SU-MIMO facilitates high data rates in favorable channel conditions. SU-MIMO consists of the simultaneous transmission of multiple data streams on the same bandwidth, where each data stream is usually termed as a layer. Multi-antenna techniques such as linear precoding are employed at the transmitter in order to differentiate the layers in the spatial domain and allow the recovery of the transmitted data by the receiver.

Another MIMO technique supported by LTE Rel-10 is multi-user MIMO (MU-MIMO), where multiple UEs belonging to the same cell are completely or partly co-scheduled on the same bandwidth and time slots. Each UE in the MU-MIMO configuration may possibly transmit multiple layers, thus operating in SU-MIMO mode.

In case of SU-MIMO, it is necessary to allow the receiver to estimate the equivalent channel associated with each transmitted layer of each UE, in order to allow detection of all of the data streams. In case of CoMP, such requirement applies also to UEs belonging to other cells but included in the joint processing cluster. Therefore, each UE needs to transmit a unique RS at least for each transmitted layer. The receiver is aware of which RS is associated with each layer, and performs estimation of the associated channel by performing a channel estimation algorithm. The estimated channel is then employed by the receiver in the detection process.

Consider co-scheduling of different UEs within the same cell on overlapping time/frequency resources for PUSCH. In this case it is desirable for the eNB to enforce orthogonality between the RSs by use of CS/OCC. The semi-statically cell-specific base sequence index (BSI) assigned to each UE within the cell according to the Rel-10 LTE standard accomplishes this goal.

When co-scheduled UEs belong to different cells, it is often preferred to enforce at least semi-orthogonality between them, independently of the allocated BW (which may be totally or partly overlapping). This can be achieved, according to the Rel-10 specification, by assigning a different cell-specific BSI for each interfering cell.

However, it is often preferable to achieve perfect orthogonality between UEs belonging to different cells, especially when the mutual interference for such UEs is potentially large. Such a feature is possible in Rel-10—in principle—by configuring the same cell-specific BSI to neighbouring cells and by making RSs of different UEs orthogonal by, e.g., use of CS and OCC. However, such a configuration presents several drawbacks.

First, the number of available CS and OCC values for a given BSI is limited. Therefore, it is not preferable to share them among several cells.

Second, when the same BSI is assigned to different UEs on partly overlapping bandwidth, the cross correlation of such sequences has an irregular distribution. This adversely affects channel estimation performance.

Third, even if an aggregated number of cells is assigned the same BSI, there always exist neighbouring cells that need to be assigned a different BSI.

These problems are solved, according to embodiments of the present invention, by dynamically deriving the BSI according to a predefined mapping rule.

In one embodiment, the BSI is a function of the starting position (in the frequency domain) of the RS and/or the bandwidth of the assigned transmission channel. These values may be expressed in terms of Resource Block indexes. The starting position and/or the bandwidth of the RS may be established as a set of scheduling assignments. For each unique set of scheduling assignments, the mapping rule provides a unique BSI. The mapping rule may be defined in many ways, so long as it is able to generate a variety of BSI in the case of different combinations of scheduling assignments and parameters.

Based on such mapping, it becomes possible to assign the same BSI to UEs belonging to different cells, but co-scheduled on fully overlapping bandwidth. At the same time, co-scheduled UEs which are not assigned to fully overlapping bandwidth are typically assigned different BSI, thus solving the above described problems with Rel-10 based assignment. This solution enables CS/OCC-based RS orthogonality for inter-cell scenarios and UEs on paired the same bandwidth, while cross-correlation peaks are avoided for UEs with unpaired BW.

It should be noted that since the number of defined BSI is limited, transmitters such as UEs assigned to different bandwidths and/or starting positions might still be occasionally assigned the same BSI. Although the methodology of embodiments of the present technology may provide unique BSI per UE per cell, since the number of defined BSI is limited, practical implementations of the mapping rule may thus occasionally assign the same BSI to multiple UE in a cell. Such events should be statistically rare, and do not significantly detract from the benefits of the invention. Accordingly, as used herein, the term "substantially unique" BSI per transmitter per cell indicates a unique BSI per transmitter within a cell, with statistically insignificant exceptions resulting from the real-world constraints of a limited number of available BSI.

Figure 4:
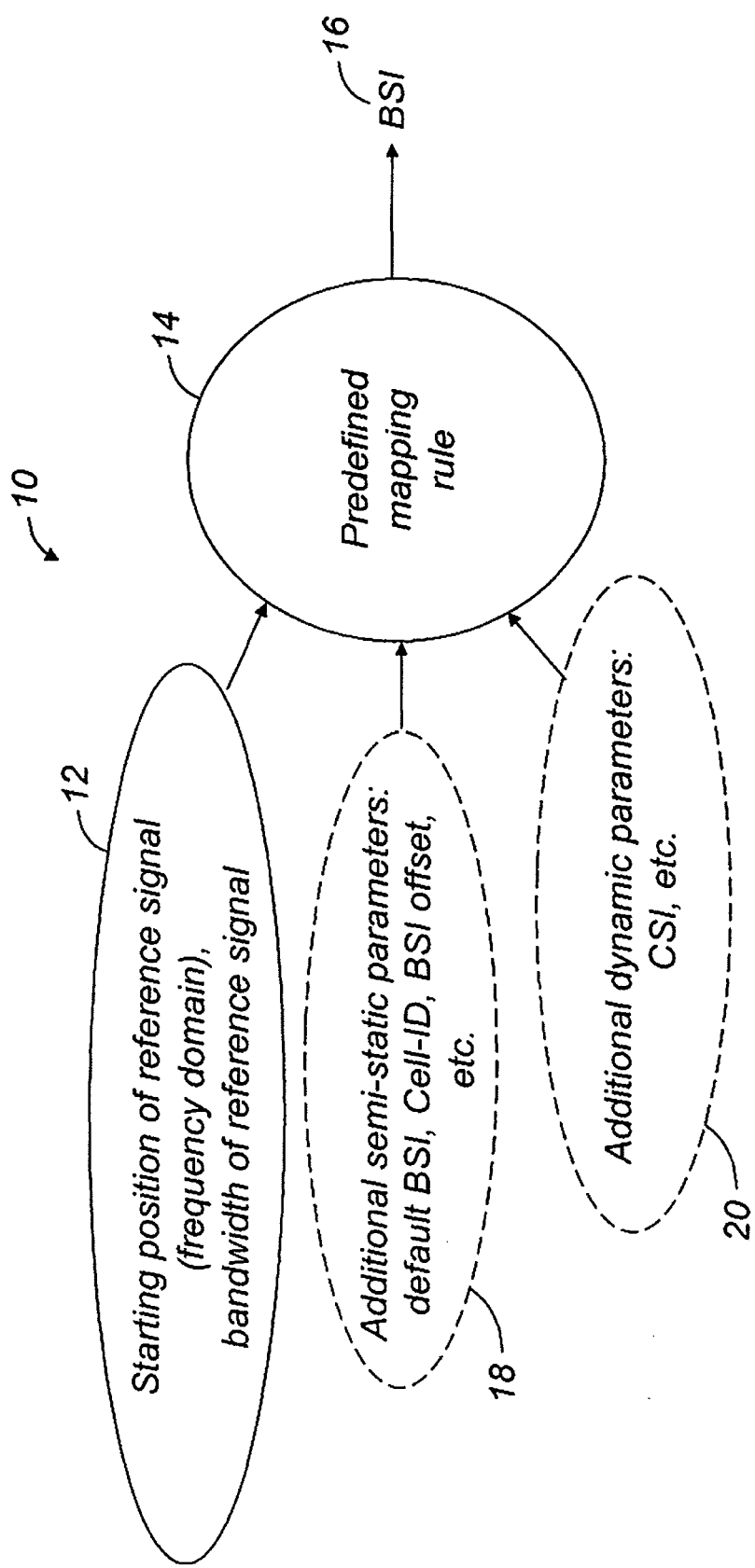
FIG. 4 is a schematic flow diagram illustrating an example of a method of generating a Base Sequence Index (BSI).

FIG. 4 depicts a flow diagram representation of an example of the process of BSI generation, indicated generally by the numeral 10. A transmitter and/or receiver such as a UE and, independently, an eNB ascertains the starting position (in the frequency domain) of the RS, and the bandwidth of the assigned transmission channel at 12. These scheduling parameters may for example be transmitted to the UE in a scheduling grant message from the eNB. These assigned scheduling parameters are input to a predefined mapping rule 14 for generating a BSI 16.

In other embodiments, additional parameters may be optional inputs to the predefined mapping rule 14. In one embodiment, one or more semi-static parameters are inputs, in addition to the RS starting position and BW 12. As indicated in FIG. 4 at 18, such semi-static parameters may include any of a default BSI value; a cell-ID value; and a configurable BSI offset value. The term semi-static means that the parameters are provisioned to one or more UEs on a relatively infrequent basis by the wireless communication network. As known in the art, semi-static parameters may be broadcast to all UEs in a cell, or may be transmitted to individual UEs in control messages.

In another embodiment, one or more dynamic parameters are optional inputs to the predefined mapping rule 14, in addition to the RS starting position and BW 12. As indicated in FIG. 4 at 20, such dynamic parameters may include the cyclic shift index (CSI), which may be transmitted to the UE in a downlink control information (DCI) assignment for a Physical Uplink Shared Channel (PUSCH). The term dynamic means that the parameters apply only to a specific UL transmission, such as a frame, subframe, slot, or other network-defined duration.

In general, the receiver may be designed to map the same additional parameters as the transmitter, according to the predefined mapping rule, to derive the same BSI as the transmitter.

For intra-cell situations, the predefined mapping rule 14 generates a BSI 16 that is substantially unique to a given transmitter within a cell, provided other transmitters within the cell are not co-scheduled on the same bandwidth.

Figure 5:
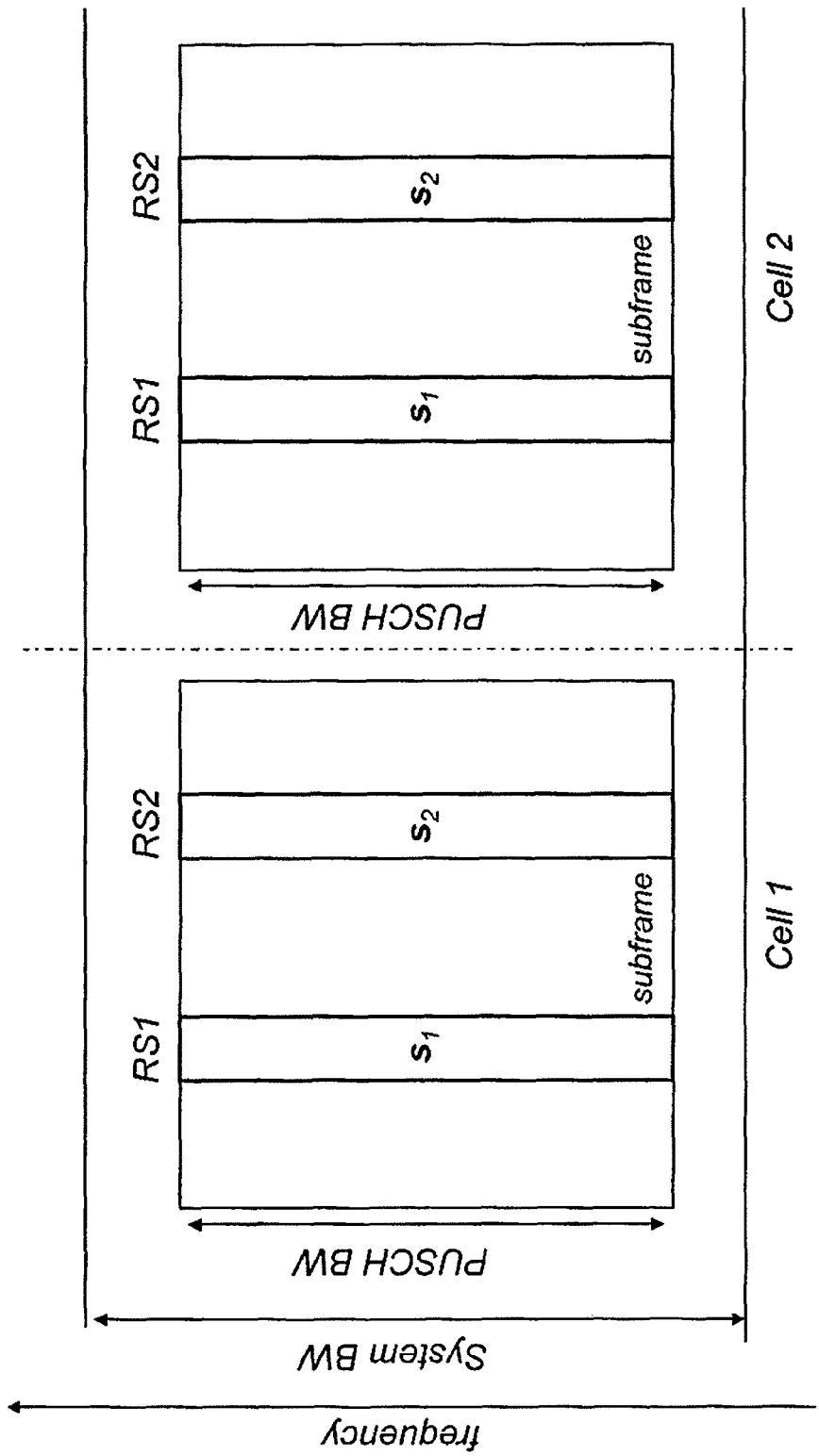
FIG. 5 is a schematic time-frequency diagram illustrating an example of transmitters in two cells having overlapping bandwidth and configured to employ the same BSI.

For inter-cell situations, because the derived BSI depends, in one embodiment, on the RS starting position (in frequency) and the transmission channel BW 12, it is possible that UE in different cells, which are co-scheduled on the same BW, will generate the same BSI (it is assumed this situation will not be scheduled intra-cell, to avoid interference). This situation is depicted in the example of FIG. 5. In this case, complete orthogonality between the UEs can be ensured by CS and OCC selection, since the UEs are operating from the same BSI.

Figure 6:
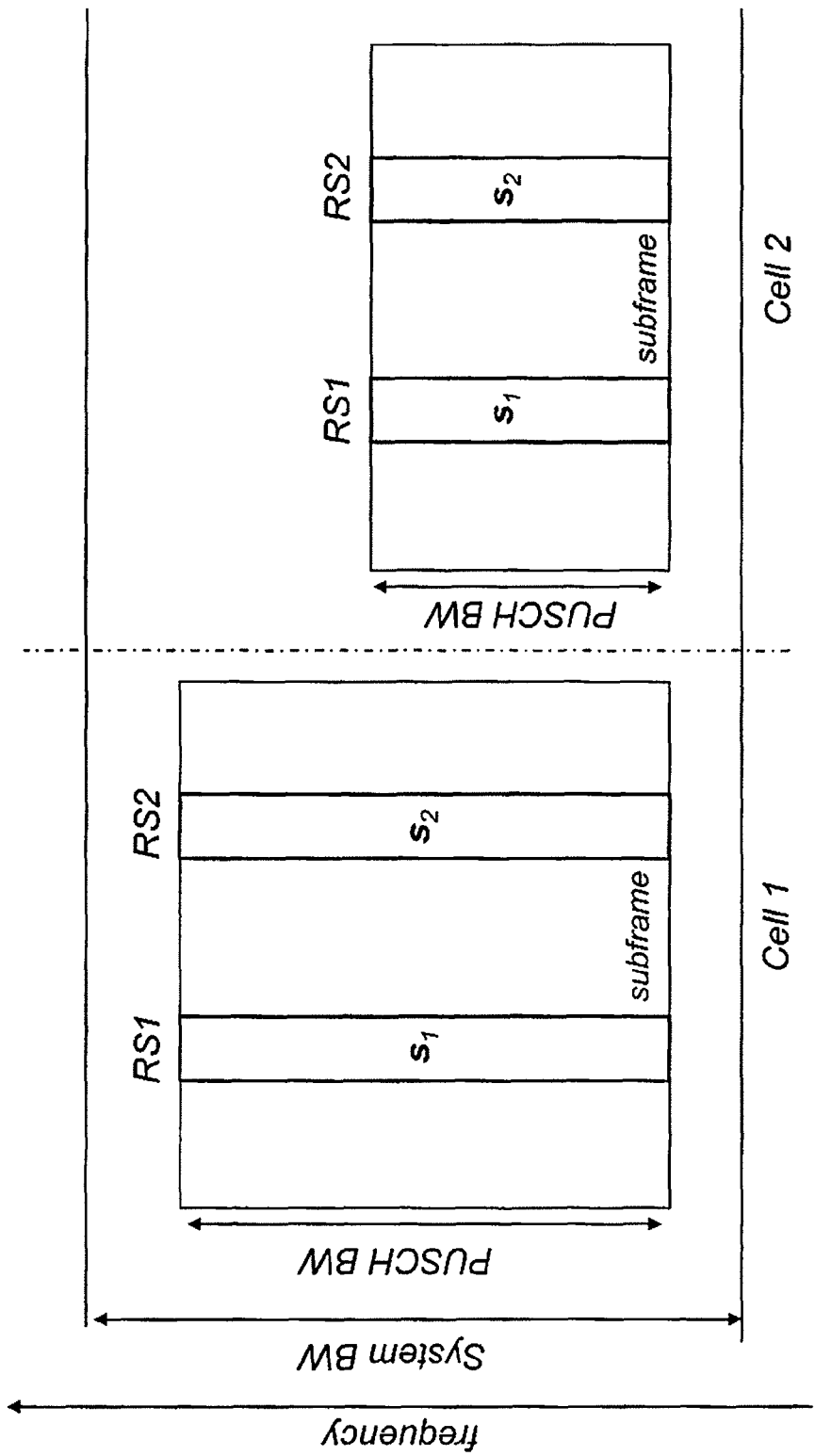
FIG. 6 is a schematic time-frequency diagram illustrating an example of transmitters in two cells having different bandwidths and configured to employ different BSI.
Figure 7:
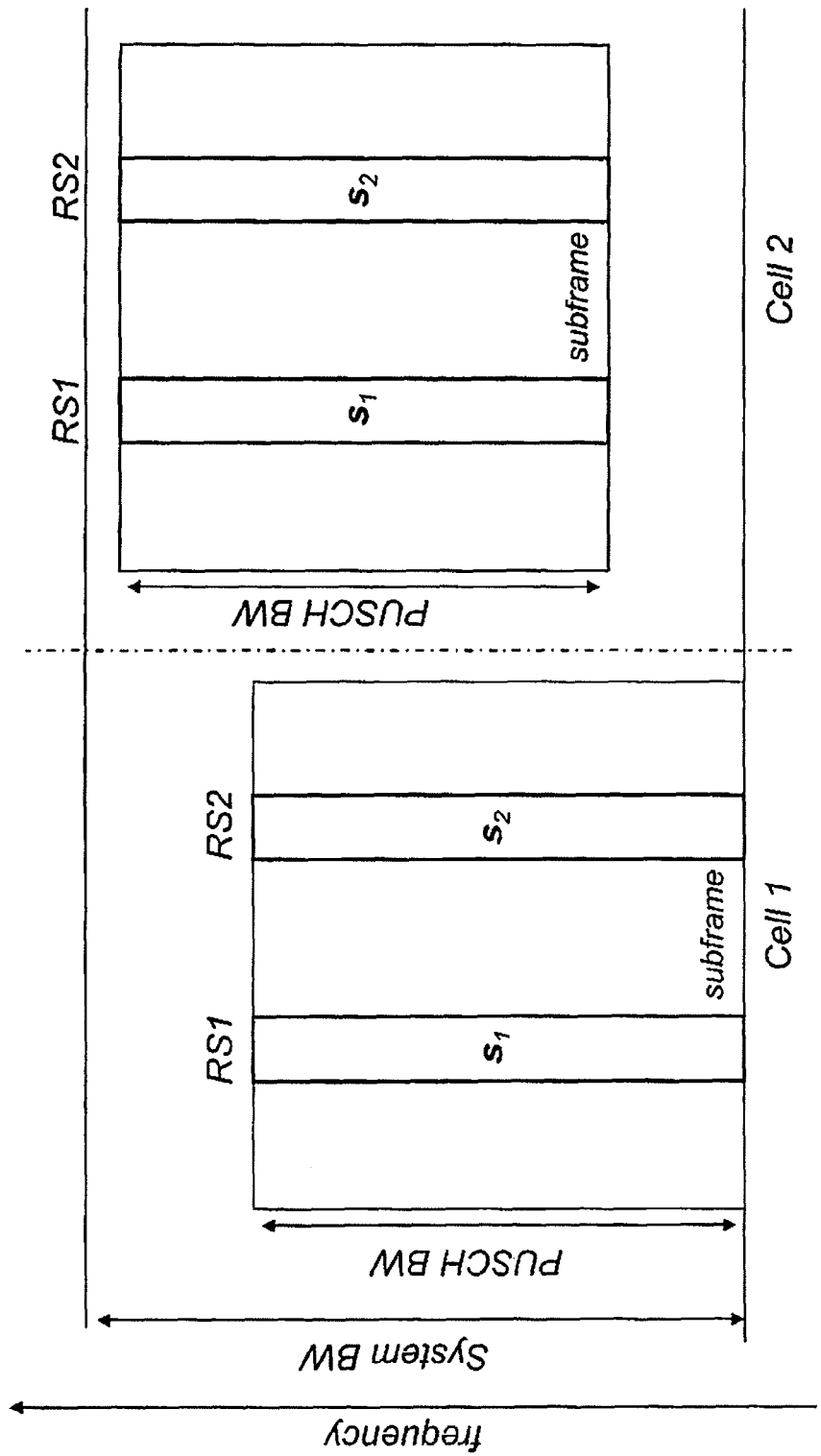
FIG. 7 is a schematic time-frequency diagram illustrating an example of transmitters in two cells having different positions in the frequency domain and configured to employ different BSI.

Conversely, as depicted in FIGS. 6 and 7, if either of these scheduling parameters is different between UEs of different cells, the BSI of UEs in different cells will not be identical. By CS and OCC selection, the RS of the UE can exhibit good correlation and semi-orthogonality. FIG. 6 depicts the case that the UEs in different cells are allocated a different transmission channel BW (e.g., PUSCH). In this case, the predefined mapping rule 14 in each UE (as well as the eNBs) will generate different BSI. Similarly, as depicted in FIG. 7, if the starting position of RS in the frequency domain is different for UEs in different cells, the respective predefined mapping rules 14 will generate different BSI.

Figure 8:
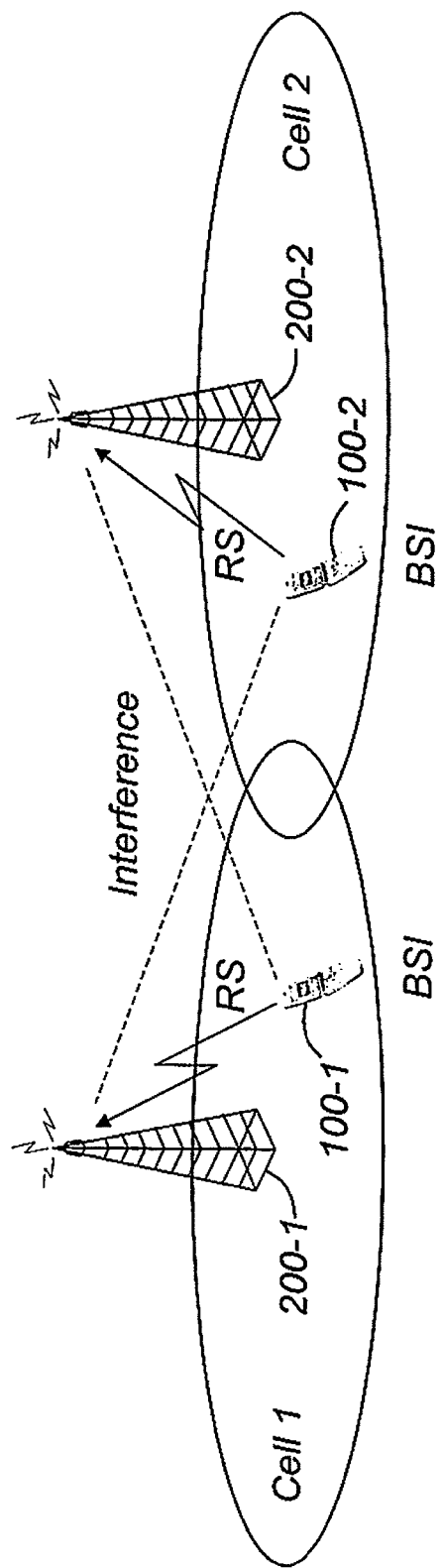
FIG. 8 is a schematic diagram illustrating an example of a wireless communication system including two base transceivers managing respective cells and serving associated mobile transceivers that are transmitting reference signals.

FIG. 8 is a schematic diagram illustrating an example of a wireless communication system including two base transceivers managing respective cells and serving associated mobile transceivers that are transmitting reference signals. In this example, the wireless communication system comprises a first base transceiver or base station 200-1, a first mobile transceiver or UE 100-1, a second base transceiver or base station 200-2, and a second mobile transceiver or UE 100-2.

The first base transceiver 200-1, such as an eNB or similar station, is operative to provide wireless communications in a first cell, Cell 1. The first mobile transceiver 100-1 is associated with the first cell and operative to transmit a reference signal, RS, to the first base transceiver 200-1, the RS comprising a data sequence based on a base sequence index, BSI, generated by the first mobile transceiver 100-1. The second base transceiver 200-2, such as an eNB or similar base station, is operative to provide wireless communications in a second different cell, Cell 2. The second mobile transceiver 100-2 is associated with the second cell and operative to transmit a reference signal, RS, to the second base transceiver, the RS comprising a data sequence based on a BSI generated by the second mobile transceiver. The RS transmissions may cause interference, and it is generally desirable to minimize or at least reduce such interference.

When the first and second mobile transceivers 100-1, 100-2 are scheduled in the respective first and second cells such that they have the same starting position, in frequency, for transmitting RS, and/or they have the same allocated transmission bandwidth for transmission of RS, the first and second mobile transceivers 100-1, 100-2 are preferably configured to generate the same BSI based on information representative of at least one of the starting position and transmission bandwidth. This enables CS/OCC-based RS orthogonality between the cells, thus mitigating or even eliminating interference. In other words, when at least one of RS starting position and transmission bandwidth is the same for the first and second mobile transceivers 100-1, 100-2, they are configured to generate the same BSI based on information representative of at least one of the RS starting position and transmission bandwidth. Preferably, both the RS starting position and transmission bandwidth are considered, and the same BSI is thus generated when both the starting position and transmission bandwidth are the same for the first and second mobile transceivers 100-1, 100-2.

At the same time, co-scheduled mobile transceivers which are not assigned to fully overlapping bandwidth are typically assigned different BSI, which will be useful to provide at least semi-orthogonality and avoid cross-correlation peaks.

In general, implicit derivation of the base sequence based on the resource allocation may be achieved through a wide range of mapping rules. A few non-limiting examples of representative mapping rules are now presented.

Let N be the number of available base sequences. In LTE, for example, the available base sequences may be divided into groups identified by a group index, g. Within a group, the base sequences may be numbered with a sequence index, s. Let $N_g$ be the number of available group indexes and $N_s$ the number of available sequence indexes within a group. The total number of base sequences, N, is thus the product of $N_s$ and $N_g$: $N=N_s \cdot N_g$. It should be understood that $N_s$ may be different for different base sequence lengths. The group number or index, g, and the sequence number or index, s, within the group may vary in time. This is called group hopping, and sequence hopping, respectively. Group hopping and sequence hopping may be switched on and off by higher layers.

Figure 9:
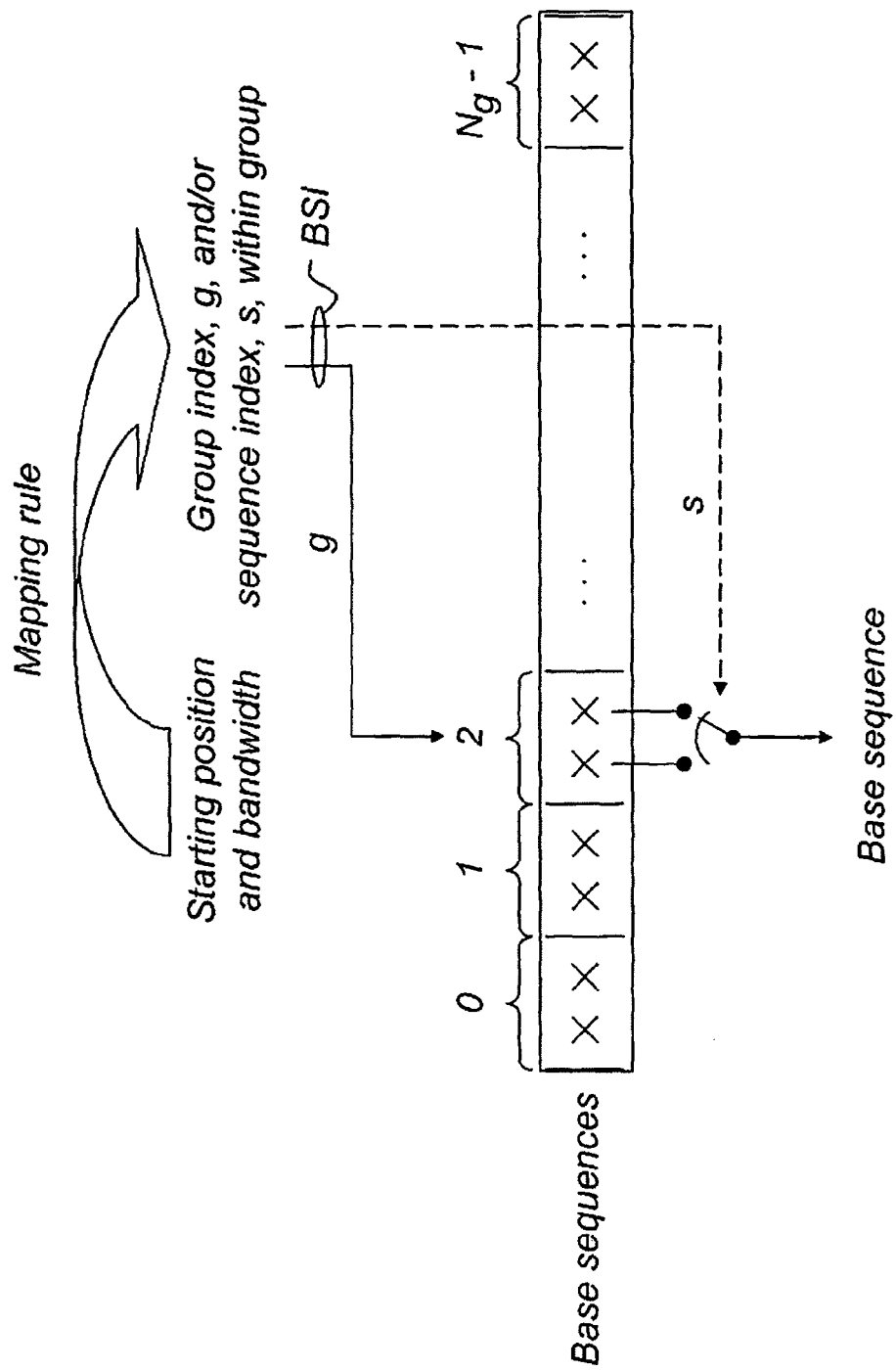
FIG. 9 is a schematic diagram illustrating an example of how to generate a Base Sequence Index, BSI, by mapping starting position and bandwidth into a group index, g, and a sequence index, s, which together define the BSI.

FIG. 9 is a schematic diagram illustrating an example of how to generate a Base Sequence Index, BSI, by mapping starting position and bandwidth into a group index, g, and/or a sequence index, s, which together define the BSI. In the particular example of FIG. 9, the available base sequences, here schematically denoted by X, are divided into groups numbered from 0 to $N_g-1$. The mapping rule may be applied to map a starting position and bandwidth of the RS into a group index, g, and/or a sequence index, s, within a group. It is possible to map the resource assignment of the RS into only one of the group index and the sequence index, and have the other index defined by default or by a higher layer. The group index g points out a particular group (e.g. group number 2) of base sequences, and the sequence index s points out a particular base sequence within that group. In other words, in this context, the group index g and the sequence index s together define the Base Sequence Index, BSI. In principle, it is possible to use the BSI as a direct index for pointing to a particular base sequence.

In an example embodiment, only the group index is implicitly derived while the sequence index is semi-statically configured by higher layer signaling. The group index is derived as:

$$g=\mathrm{mod}(n\_start+n\_BW+g\_offset+g\_hopping, N_g),$$
where g is the group index;
n_start is the start RB index for Physical Uplink Shared Channel, PUSCH;
n_BW is the PUSCH bandwidth in Resource Blocks, RBs;
g_hopping is an optional group hopping offset given by a pseudo-random hopping rule; and
g_offset is a semi-static offset term. The mod operator indicates the division remainder; mod(a, b) is defined as the remained of the division of a by b, where a and b are the considered variables.

In some embodiments, the term g_hopping is not present. In practice, g_hopping can assume non-zero values only when hopping mechanisms (such as sequence/group hopping in LTE) are enabled.

The term g_offset may be the combination of several offset terms given by, e.g., cell-ID, and group index offset. Since such terms are typically configured for a number of subframes, here they have been lumped together into a unique term for clarity of expression and without loss of generality.

The term g_hopping normally corresponds to the standard group hopping pattern, and the term g_offset normally corresponds to the standard sequence-shift pattern of the technical specification 3GPP TS 36.211, V 10.2.0 (2011-06).

In another example embodiment, both the group sequence and the sequence index are implicitly derived:

$$g=\mathrm{mod}(\mathrm{floor}((n\_start+n\_BW+g\_offset+g\_hopping)/N_s), N_g)$$

$$s=\mathrm{mod}(n\_start+n\_BW+s\_offset+s\_hopping, N_s),\text{ where}$$

g is the group index;
s is the sequence index;
n_start is the start RB index for Physical Uplink Shared Channel, PUSCH;
n_BW is the PUSCH bandwidth in Resource Blocks, RBs;
g_hopping is an optional group hopping offset given by a pseudo-random hopping rule;
s_hopping is an optional sequence hopping offset given by a pseudo-random hopping rule; and
s_offset is a semi-static offset term;
g_offset is a semi-static offset term. The floor operator indicates the greatest integer operator.

In some embodiments the term s_hopping is not present. In practice, s_hopping can assume non-zero values only when hopping mechanisms (such as sequence/group hopping in LTE) are enabled.

In yet another example embodiment, $$g=\mathrm{mod}(n\_start+n\_BW+g\_offset+g\_hopping, N_g)$$

$$s=\mathrm{mod}(\mathrm{floor}((n\_start+n\_BW+s\_offset+s\_hopping)/N_g), N_s).$$

Other examples include cases where the terms n_start, n_BW, and optionally also g_offset, g_hopping, s_offset, and n_hopping are combined in a linear and/or non-linear fashion.

From the BSI derived according to embodiments of the present invention, RS data sequences may be generated as known in the art, e.g., by dynamic application of CS and OCC to base sequence indexed by the BSI.

It has also been recognized that information representative of the bandwidth resource allocation may be used for determining the so-called group hopping pattern and cyclic shift hopping pattern. By way of example, a group hopping pattern can be determined based on at least one ascertained of the starting position and transmission channel bandwidth. The step of deriving the base sequence index, BSI, may then be based also on the determined group hopping pattern; e.g. by applying the determined group hopping pattern to the predefined mapping rule. It is also possible to determine a cyclic shift hopping pattern based on at least one ascertained of the starting position and transmission channel bandwidth. The step of determining the RS may then be based also on the determined cyclic shift hopping pattern. In general, group hopping randomizes the BSI, while cyclic shift hopping randomizes the cyclic shift, CS. The group hopping pattern and cyclic shift hopping pattern may be determined based on the starting position and/or transmission channel bandwidth via other intermediate parameters such as cell-ID and so-called sequence shift.

For general information on group hopping, sequence hopping and cyclic shift hopping, reference can for example be made to sections 5.5.1.3, 5.5.1.4 and 5.5.2.1.1, respectively, of the technical specification 3GPP TS 36.211, V 10.2.0 (2011-06).

Embodiments of the present invention solve many problems noted in prior art methods of RS sequence generation. Since the number of available CS and OCC values for a given BSI is limited, these values need not be shared across several cells. Cross correlation of BSI sequences assigned to different UEs on partly overlapping bandwidth is avoided, since in this case the UEs generate different BSI. Hence, the irregular distribution of such cross correlation, and its adverse affects on channel estimation performance, are avoided. A given pool of BSI values need not be spread across a number of cells, leaving neighbouring cells with need for different BSI, since all BSI are generated by each UE based on its scheduling parameters.

Embodiments of the present invention further reduce interference on RS compared to the prior art by enabling orthogonal DMRS assignments for UEs belonging to different cells. Furthermore, good correlation and semi-orthogonal RS are preserved between different cells in case of non-overlapping bandwidths.

As already mentioned, the present technology is applicable to transmitters and/or receivers in both the uplink and the downlink, and may e.g. involve any type of user equipment and/or any type of radio base station.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits, e.g. implemented as a controller.

Many aspects of the present technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device, e.g. implemented as a controller.

It should also be understood that it may be possible to re-use the general processing capabilities of any device or unit in which the present technology is implemented, such as a UE and/or a radio base station. It may also be possible to re-use existing software, e.g. by reprogramming of the existing software or by adding new software components.

Figure 10:
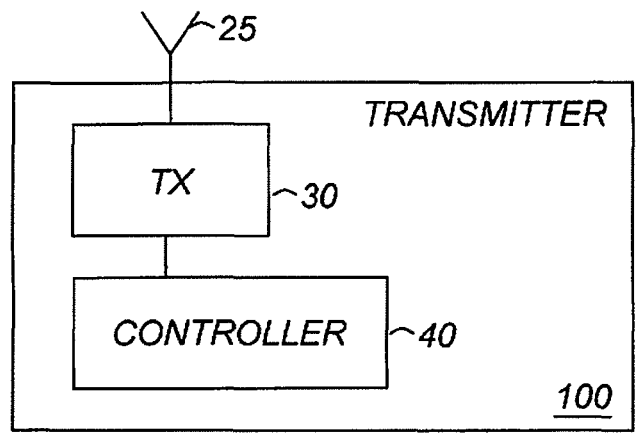
FIG. 10 is a schematic block diagram illustrating an example of a transmitter.

FIG. 10 is a schematic block diagram illustrating an example of a transmitter. The transmitter 100 basically comprises an antenna 25, and a transmitter, TX, 30 operatively coupled to the antenna 25 and configured to transmit a reference signal, RS, to a receiver. The transmitter further comprises a controller 40 configured to control the transmitter, and configured to ascertain at least one of a starting position, in the frequency domain, of the RS to transmit, and a bandwidth allocated to the transmitter for transmission of the RS, derive a base sequence index, BSI, by mapping at least one ascertained of the starting position and transmission bandwidth, i.e. starting position and/or bandwidth, according to a predefined mapping rule to the BSI, and determine a sequence to transmit as the RS based on the derived BSI.

According to a particular example, the controller 40 is configured to ascertain the starting position in the frequency domain of RS to transmit and the bandwidth allocated to the transmission channel by receiving the starting position and transmission channel bandwidth in a scheduling assignment message, and derive the base sequence index based on both the starting position and transmission bandwidth.

By way of example, the controller 40 may be configured to determine a sequence to transmit as the RS based on the derived BSI by applying a cyclic shift, CS, value to a base sequence indexed by the BSI.

The controller 40 may further be configured to determine a sequence to transmit as the RS based on the derived BSI by applying an orthogonal cover code, OCC, to the base sequence shifted by the CS.

In an example embodiment, the controller 40 is configured to derive a base sequence index, BSI, substantially unique to the transmitter among transmitters in the same cell. Preferably, the controller 40 is configured to derive a base sequence index, BSI, substantially unique to the transmitter among transmitters in the same cell, as the other transmitters within the cell are not co-scheduled on the same bandwidth.

Figure 11:
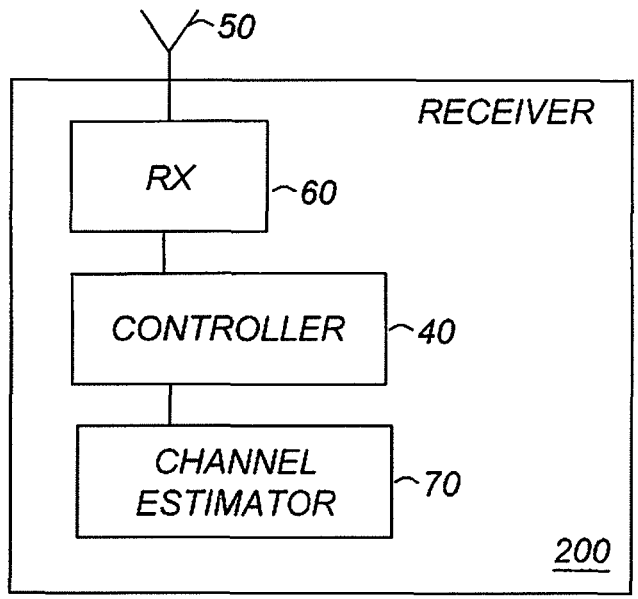
FIG. 11 is a schematic block diagram illustrating an example of a receiver.

FIG. 11 is a schematic block diagram illustrating an example of a receiver. The receiver 200 basically comprises an antenna 50, a receiver, RX, 60 operatively coupled to the antenna 50 and configured to receive a reference signal, RS, transmitted from a transmitter, wherein the received RS differs from the RS initially transmitted from the transmitter due to distortion effects injected by the wireless communication channel. The receiver therefore further comprises a controller 40 configured to ascertain at least one of a starting position, in the frequency domain, of the RS, and a bandwidth allocated to a transmission channel for the RS, derive a base sequence index, BSI, by mapping at least one ascertained of the starting position and transmission channel bandwidth, i.e. starting position and/or bandwidth, according to a predefined mapping rule to the BSI, and determine the RS initially transmitted from the transmitter based on the derived BSI. The receiver also comprises a channel estimator 70 configured to execute a channel estimation algorithm and estimate the wireless communication channel based on the received RS and the determined RS.

Figure 12:
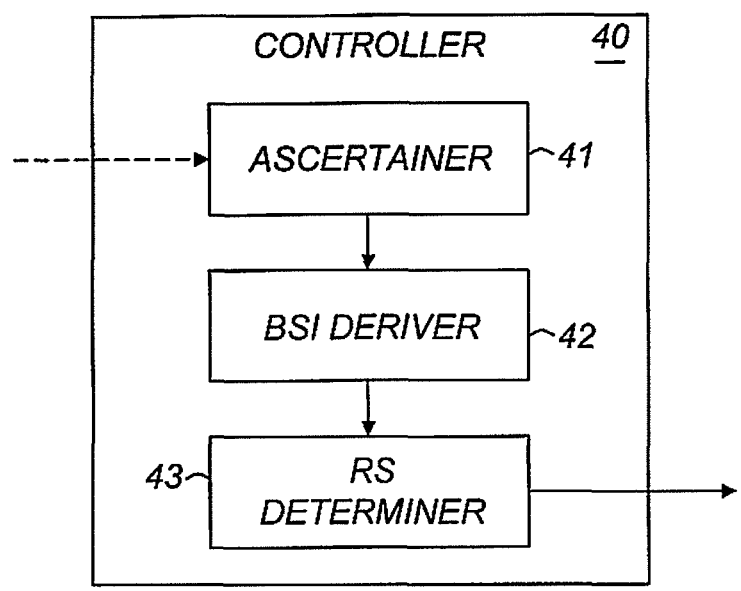
FIG. 12 is a schematic block diagram illustrating an example of a controller.

FIG. 12 is a schematic block diagram illustrating an example of a controller. The controller 40 of FIG. 12 comprises an ascertainer 41, a BSI deriver 42, and an RS determiner 43. The ascertainer 41 is configured to ascertain at least one of the starting position of the RS and the transmission channel bandwidth for the RS. The BSI deriver 42 is configured to derive a base sequence index, BSI, by mapping at least one of the starting position and transmission channel bandwidth, i.e. starting position and/or bandwidth, into the BSI according to a predefined mapping rule. The RS determiner 43 is configured to determine the RS based on the derived BSI. Basically, the controller 40 is configured to perform the previously described method.

In the following, an example of a computer-implementation of the controller will be described with reference to FIG. 13.

Figure 13:
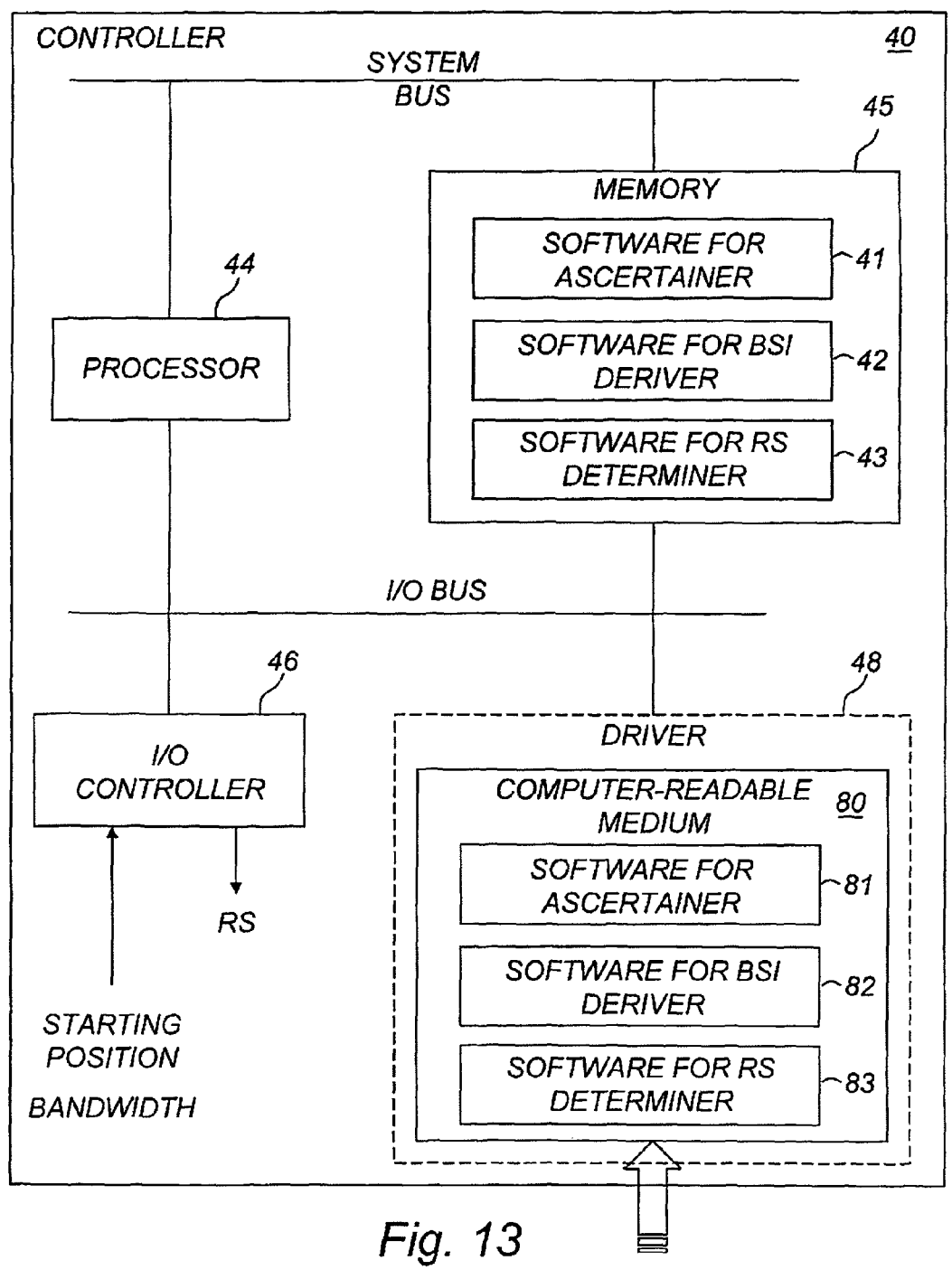
FIG. 13 is a schematic block diagram illustrating an example of a computer-implementation of a controller.

FIG. 13 is a schematic block diagram illustrating an example of a computer-implementation of a controller according to an embodiment. The controller 40 of this embodiment is based on a processor 44 such as a micro processor or digital signal processor, a memory 45, an input/output (I/O) 46 and an optional driver 48 for a computer-readable medium 80.

In this particular example, at least some of the steps, functions and/or blocks described above are implemented in software, which is loaded into memory 45 for execution by the processor 44. The processor 44 and the memory 45 are interconnected to each other via a system bus to enable normal software execution. The I/O controller 46 may be interconnected to the processor 44 and/or memory 45 via an I/O bus to enable input and/or output of relevant data such as input parameter(s) and/or resulting output parameter(s).

In this particular example, the memory 45 includes a number of software components 41, 42 and 43 for implementing the functionality of the embodiments described above including steps, functions, procedures and/or blocks. In particular, software component 41 includes software for an ascertainer, software component 42 includes software for a BSI deriver, and software component 43 includes software for a RS determiner.

More particularly, the I/O controller 46 may receive information about a starting position, in the frequency domain, of the RS, and/or a bandwidth allocated to a transmission channel for the RS. Optionally, additional information may also be received, as previously explained. The received information can then be transferred to the processor 210 and/or memory 220 for use as input during execution of the software. In this example, the received information is applied to the software component 41, which is configured to ascertain or establish, when executed, the starting position of the RS and/or the transmission channel bandwidth for the RS. The software component 42 for the BSI deriver is configured to derive, when executed, a base sequence index, BSI, by mapping at least one of the starting position and transmission channel bandwidth according to a predefined mapping rule into the BSI. The software component 43 for the RS determiner is configured to determine, when executed, the RS based on the derived BSI.

The resulting reference signal, RS, may be transferred as output via the I/O controller 46. If there is additional software that needs the resulting reference signal as input, the RS can be retrieved directly from memory 45. For transmission by a transmitter, the determined RS is normally transferred to the TX unit for the actual transmission. For use by a receiver for channel estimation, the determined RS may be transferred as input to a channel estimation algorithm, as previously explained.

Moreover, the present technology can additionally be considered to be embodied within any form of non-transitory computer-readable storage medium having stored therein an appropriate set of instructions for use by or in connection with an instruction-execution system, apparatus, or device, such as a computer-based system, processor-containing system, or other system that can fetch instructions from a medium and execute the instructions to perform the disclosed method.

The software, here exemplified in the form of software components 81, 82, and 83, may then be realized as a computer program product, which is normally carried on a non-transitory computer-readable medium 80, for example a CD, DVD, USB memory, hard drive or any other conventional memory device. The software may thus be loaded into the memory 45 of the controller or equivalent computer or processing system for execution by the processor 44.

The computer/processor/controller does not have to be dedicated to execute only the above-described steps, functions, procedure and/or blocks, but may also execute other software tasks.

The present technology may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A computer-based method performed by a controller circuit of a transmitter for generating a reference signal (RS) in a wireless communication system, comprising:
   ascertaining, by an ascertainer circuit of the controller circuit in the transmitter, a starting position, in the frequency domain, of the RS, and a transmission channel bandwidth for the RS;
   deriving, by a base sequence index (BSI) deriver circuit of the controller circuit, the BSI deriver circuit being operationally coupled to the ascertainer circuit, a BSI by mapping the starting position and the transmission channel bandwidth according to a predefined mapping rule to the BSI, wherein the predefined mapping rule maps a combination of a starting resource block (RB) index for a physical uplink channel and a bandwidth of the physical uplink channel to a group index, the predefined mapping rule constrained by a number of available group indexes;
   determining, by an RS determiner circuit of the controller circuit, the RS determiner circuit being operationally coupled to the BSI deriver circuit, the RS based on the derived BSI; and
   wherein the determined RS is transmitted from the transmitter to a receiver in the wireless communication system.

2. The method of claim 1, wherein ascertaining the starting position and the transmission channel bandwidth includes receiving the starting position and the transmission channel bandwidth in a scheduling assignment message.

3. The method of claim 1 wherein determining the RS based on the derived BSI comprises applying a cyclic shift (CS) value to a base sequence indexed by the BSI.

4. The method of claim 3 wherein determining the RS based on the derived BSI comprises applying an orthogonal cover code (OCC) to the base sequence shifted by the CS.

5. The method of claim 1, wherein deriving the BSI includes deriving the BSI so that the BSI is unique to the transmitter that is among a plurality of transmitters in a cell.

6. The method of claim 5, wherein the other transmitters in the cell are not co-scheduled on the same transmission channel bandwidth as the transmitter.

7. The method of claim 1, wherein deriving the BSI by mapping the starting position and the transmission channel bandwidth according to the predefined mapping rule provides for an assignment of the same BSI to User Equipments (UEs) belonging to different cells, but co-scheduled on fully overlapping bandwidth, and assignment of different BSI to co-scheduled UEs which are not assigned to fully overlapping bandwidth.

8. The method of claim 1, wherein deriving the BSI includes mapping a default BSI value according to the predefined mapping rule.

9. The method of claim 1, wherein deriving the BSI includes mapping a cell identification (Cell-ID) according to the predefined mapping rule.

10. The method of claim 1, wherein deriving the BSI includes mapping a configurable BSI offset according to the predefined mapping rule.

11. The method of claim 1, wherein deriving the BSI includes mapping a cyclic shift index (CSI) according to the predefined mapping rule.

12. The method of claim 11 wherein the transmitter obtains the CSI from a downlink control information (DCI) assignment for a Physical Uplink Shared Channel (PUSCH).

13. The method of claim 1, further comprising:
    determining a group hopping pattern based on at least one of the starting position and the transmission channel bandwidth; and
    wherein deriving the BSI includes deriving the BSI based also on the determined group hopping pattern.
14. The method of claim 1, further comprising:
    determining a cyclic shift hopping pattern based on at least one of the starting position and the transmission channel bandwidth, wherein determining the RS includes determining the RS based also on the determined cyclic shift hopping pattern.
15. The method of claim 1, wherein ascertaining, deriving the BSI—and determining the RS are performed by a receiver of the wireless communication system, wherein the determined RS corresponds to an RS initially transmitted from a transmitter to the receiver.
16. The method of claim 15, further comprising:
    mapping, by the receiver, the starting position of the RS and the transmission channel bandwidth for the RS, according to the predefined mapping rule, to derive the same BSI as the transmitter.
17. The method of claim 1, wherein the predefined mapping rule comprises:

$g = \mod(n\_start + n\_BW, N_g)$, where g is a group index;
    n_start is a start RB index for Physical Uplink Shared Channel, PUSCH;
    n_BW is a PUSCH bandwidth in Resource Blocks, RBs;
    $N_g$ is a number of available group indexes; and
    the mod operator indicates the division remainder.
18. The method of claim 1, wherein the predefined mapping rule comprises:

$g = \mod(\text{floor}((n\_start + n\_BW)/N_s), N_g)$ and $s = \mod(n\_start + n\_BW, N_s)$, where g is a group index;
    s is a sequence index;
    n_start is a start RB index for Physical Uplink Shared Channel, PUSCH;
    n_BW is a PUSCH bandwidth in Resource Blocks, RBs;
    $N_g$ is a number of available group indexes;
    $N_s$ is a number of available sequence indexes; and
    the mod operator indicates the division remainder, and the floor operator indicates the greatest integer operator.
19. The method of claim 1, wherein the predefined mapping rule comprises:

$g = \mod(n\_start + n\_BW, N_g)$ and $s = \mod(\text{floor}((n\_start + n\_BW)/N_g), N_s)$, where g is a group index;
    s is a sequence index;
    n_start is a start RB index for Physical Uplink Shared Channel, PUSCH;
    n_BW is a PUSCH bandwidth in Resource Blocks, RBs;
    $N_g$ is a number of available group indexes;
    $N_s$ is a number of available sequence indexes; and
    the mod operator indicates the remainder, and the floor operator indicates the greatest integer operator.
20. The method of claim 1, wherein determining the RS based on the derived BSI uses a cyclic shifter circuit operationally coupled to the controller circuit.
21. A controller circuit of a transmitter for generating a reference signal (RS) in a wireless communication system, wherein the controller circuit is configured to:
    ascertain, by an ascertainer circuit of the controller circuit in the transmitter, a starting position, in the frequency domain, of the RS, and a transmission channel bandwidth for the RS;
    derive, by a base sequence index (BSI) deriver circuit of the controller circuit, the BSI deriver circuit being operationally coupled to the ascertainer circuit, a BSI by mapping the starting position and the transmission channel bandwidth according to a predefined mapping rule to the BSI, wherein the predefined mapping rule maps a combination of a starting resource block (RB) index for a physical uplink channel and a bandwidth of the physical uplink channel to a group index, the predefined mapping rule constrained by a number of available group indexes;
    determine, by an RS determiner circuit of the controller circuit, the RS determiner circuit being operationally coupled to the BSI deriver circuit, the RS based on the derived BSI; and
    wherein the determined RS is transmitted from the transmitter to a receiver in the wireless communication system.
22. A computer program product comprising a non-transitory computer readable medium having stored therein a set of instructions for performing, when executed by a computer-based system of a transmitter in a wireless communication system, the steps of:
    ascertaining, by an ascertainer circuit of the computer-based system in the transmitter, a starting position, in the frequency domain, of the RS, and a transmission channel bandwidth for the RS;
    deriving, by a base sequence index (BSI) deriver circuit of the computer-based system, the BSI deriver circuit being operationally coupled to the ascertainer circuit, a BSI by mapping the starting position and the transmission channel bandwidth according to a predefined mapping rule to the BSI, wherein the predefined mapping rule maps a combination of a starting resource block (RB) index for a physical uplink channel and a bandwidth of the physical uplink channel to a group index, the predefined mapping rule constrained by a number of available group indexes;
    determining, by an RS determiner circuit of the computer-based system, the RS determiner circuit being operationally coupled to the BSI deriver circuit, the RS based on the derived BSI; and
    wherein the determined RS is transmitted from the transmitter to a receiver in the wireless communication system.
23. A transmitter device, comprising:
    an antenna;
    a transmitter (TX) operatively coupled to the antenna and configured to transmit a reference signal (RS) to a receiver; and
    a controller circuit operationally coupled to the transmitter and configured to include:
        an ascertainer circuit configured to ascertain a starting position, in the frequency domain, of the RS to transmit, and a transmission channel bandwidth of the RS;
        a base sequence index (BSI) deriver circuit operatively coupled to the ascertainer circuit and configured to derive a BSI by mapping the starting position and the transmission channel bandwidth according to a predefined mapping rule to the BSI, wherein the predefined mapping rule maps a combination of a starting resource block (RB) index for a physical uplink channel and a bandwidth of the physical uplink channel to a group index, the predefined mapping rule constrained by a number of available group indexes; and an RS determiner circuit operatively coupled to the BSI deriver circuit and configured to determine a sequence to transmit as the RS based on the derived BSI.

24. The transmitter device of claim 23, wherein the ascertainer circuit is further configured to:

ascertain the starting position in the frequency domain of the RS to transmit and the transmission channel bandwidth by receiving the starting position and the transmission channel bandwidth in a scheduling assignment message; and the BSI deriver circuit is further configured to:

derive the BSI based on both the starting position and the transmission channel bandwidth.

25. The transmitter device of claim 23 wherein the RS determiner circuit is further configured to determine the sequence to transmit as the RS based on the derived BSI by applying a cyclic shift (CS) value to a base sequence indexed by the BSI.

26. The transmitter device of claim 25 wherein the RS determiner circuit is further configured to determine the sequence to transmit as the RS based on the derived BSI by applying an orthogonal cover code (OCC) to the base sequence shifted by the CS.

27. The transmitter device of claim 23, wherein the BSI deriver circuit is further configured to derive the BSI that is unique to the transmitter among a plurality of transmitters in a cell.

28. The transmitter device of claim 27, wherein the other transmitters in the cell are not co-scheduled on the same transmission channel bandwidth as the transmitter.

29. A receiver device, comprising:

an antenna;

a receiver (RX) operatively coupled to the antenna and configured to receive a reference signal (RS) transmitted from a transmitter, wherein the received RS differs from the RS initially transmitted from the transmitter due to distortion effects injected by a wireless communication channel; and a controller circuit operatively coupled to the receiver and configured to include:

an ascertainer circuit configured to ascertain a starting position, in the frequency domain, of the RS, and a transmission channel bandwidth for the RS;

a base sequence index (BSI) deriver circuit operatively coupled to the ascertainer circuit and configured to derive a BSI by mapping the starting position and the transmission channel bandwidth according to a predefined mapping rule to the BSI, wherein the predefined mapping rule maps a combination of a starting resource block (RB) index for a physical uplink channel and a bandwidth of the physical uplink channel to a group index, the predefined mapping rule constrained by a number of available group indexes; and an RS determiner circuit operatively coupled to the BSI deriver circuit and configured to determine the RS initially transmitted from the transmitter based on the derived BSI; and a channel estimator circuit operatively coupled to the controller circuit and configured to execute a channel estimation algorithm and estimate the wireless communication channel based on the received RS and the determined RS.

30. A wireless communication system, comprising:

a first base transceiver operative to provide wireless communications in a first cell;

a first mobile transceiver associated with the first cell and operative to transmit a first reference signal (RS) to the first base transceiver, the first RS comprising a first data sequence based on a first base sequence index (BSI) generated by the first mobile transceiver;

a second base transceiver operative to provide wireless communications in a second cell;

a second mobile transceiver associated with the second cell and operative to transmit a second RS to the second base transceiver, the second RS comprising a second data sequence based on a second BSI generated by the second mobile transceiver;

wherein when the first mobile transceiver and the second mobile transceiver are scheduled in their respective first cell and second cell so that a starting position of the first mobile transceiver is the same as a starting position of the second mobile transceiver, in the frequency domain, for transmitting RS and that a transmission channel bandwidth for the RS of the first mobile transceiver is the same as a transmission channel bandwidth for the RS of the second mobile transceiver, the first BSI is the same as the second BSI, wherein each of the first BSI and the second BSI is based on mapping the starting position of the first or second mobile transceiver, respectively, and the transmission channel bandwidth of the first or second mobile transceiver, respectively, according to a predefined mapping rule, wherein the predefined mapping rule maps a combination of a starting resource block (RB) index for a physical uplink channel and a bandwidth of the physical uplink channel to a group index, the predefined mapping rule constrained by a number of available group indexes.

31. A controller circuit of a transmitter for generating a reference signal (RS) in a wireless communication system, said controller circuit comprising:

a memory configured to store data and computer-executable instructions; and a processor operatively coupled to the memory, wherein the processor and memory are configured to include:

an ascertainer circuit configured to ascertain a starting position, in the frequency domain, of the RS, and a transmission channel bandwidth for the RS;

a base sequence index (BSI) deriver circuit operatively coupled to the ascertainer circuit and configured to derive a BSI by mapping the starting position and the transmission channel bandwidth according to a predefined mapping rule, wherein the predefined mapping rule maps a combination of a starting resource block (RB) index for a physical uplink channel and a bandwidth of the physical uplink channel to a group index, the predefined mapping rule constrained by a number of available group indexes; and an RS determiner circuit operatively coupled to the BSI deriver circuit and configured to determine the RS based on the derived BSI; and wherein the determined RS is transmitted from the transmitter to a receiver in the wireless communication system.

* * * * *